United States Patent
Choi et al.

(10) Patent No.: US 10,027,235 B2
(45) Date of Patent: Jul. 17, 2018

(54) SELF-TUNING ADAPTIVE DEAD TIME CONTROL FOR CONTINUOUS CONDUCTION MODE AND DISCONTINUOUS CONDUCTION MODE OPERATION OF A FLYBACK CONVERTER

(71) Applicant: FAIRCHILD SEMICONDUCTOR CORPORATION, Sunnyvale, CA (US)

(72) Inventors: Hangseok Choi, Bedford, NH (US); Lei Chen, San Jose, CA (US); Cheng-Sung Chen, Hsinchu (TW)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 0 days.

(21) Appl. No.: 15/358,703

(22) Filed: Nov. 22, 2016

(65) Prior Publication Data
US 2017/0222569 A1    Aug. 3, 2017

Related U.S. Application Data

(60) Provisional application No. 62/290,160, filed on Feb. 2, 2016.

(51) Int. Cl.
*H02M 3/335* (2006.01)
*H02M 1/088* (2006.01)
*H02M 1/38* (2007.01)
*H02M 1/00* (2006.01)

(52) U.S. Cl.
CPC ....... *H02M 3/33592* (2013.01); *H02M 1/088* (2013.01); *H02M 1/38* (2013.01); *H02M 3/33515* (2013.01); *H02M 2001/0003* (2013.01); *H02M 2001/0048* (2013.01); *Y02B 70/1475* (2013.01); *Y02B 70/1491* (2013.01)

(58) Field of Classification Search
CPC .... H02M 3/33592; H02M 1/088; H02M 1/38; H02M 3/33515; H02M 2001/0003; H02M 2001/0048
See application file for complete search history.

(56) References Cited

U.S. PATENT DOCUMENTS

| 7,199,636 B2 | 4/2007 | Oswald et al. |
| 9,608,532 B2* | 3/2017 | Wong ................ H02M 3/33592 |
| 2013/0063985 A1* | 3/2013 | Ye ............................ H02M 1/38 363/21.05 |
| 2016/0294298 A1* | 10/2016 | Wong ................ H02M 3/33592 |

(Continued)

OTHER PUBLICATIONS

FAN501A—Offline DCM/CCM Flyback PWM Controller for Charger Applications, 2014, pp. 1-16, Fairchild Semiconductor Corporation.

(Continued)

*Primary Examiner* — Jue Zhang
*Assistant Examiner* — Lakaisha Jackson
(74) *Attorney, Agent, or Firm* — AMPACC Law Group, PLLC

(57) ABSTRACT

A flyback converter includes a primary-side switch that controls conduction of current on a primary side of a transformer and a synchronous rectifier on a secondary side of the transformer. A synchronous rectifier driver controls the conduction of the synchronous rectifier by adaptively adjusting a turn-off threshold of the synchronous rectifier.

19 Claims, 13 Drawing Sheets

(56) References Cited

U.S. PATENT DOCUMENTS

2016/0373019 A1* 12/2016 Hsu .................. H02M 3/33592

OTHER PUBLICATIONS

FAN6204—nWSaver Synchronous Rectification Controller for Flyback and Forward Freewheeling Rectification, 2012, pp. 1-14, Fairchild Semiconductor Corporation.
AN6204—FAN6204 Synchronous Rectification Controller for Flyback and Forward Freewheeling Rectification, 2011, pp. 1-8, Fairchild Semiconductor Corporation.
Linear Technology LT8309—Secondary-Side Synchronous Rectifier Driver, pp. 1-14 [retrieved on Jan. 8, 2016], retrieved from the internet: www.linear.com/LT8309.

* cited by examiner

SELF-TUNING ADAPTIVE DEAD TIME CONTROL FOR CONTINUOUS CONDUCTION MODE AND DISCONTINUOUS CONDUCTION MODE OPERATION OF A FLYBACK CONVERTER

CROSS-REFERENCE TO RELATED APPLICATION

This application claims the benefit of U.S. Provisional Application No. 62/290,160, filed on Feb. 2, 2016, which is incorporated herein by reference in its entirety.

BACKGROUND OF THE INVENTION

1. Field of the Invention

The present invention relates generally to electrical circuits, and more particularly but not exclusively to flyback converters.

2. Description of the Background Art

A flyback converter is a buck-boost converter where the output inductor is split to form a transformer. In a flyback converter, a primary-side switch is closed to connect the primary winding of the transformer to an input voltage source. Closing the primary-side switch increases the primary current and magnetic flux, stores energy in the transformer, and induces current on the secondary winding of the transformer. The induced current on the secondary winding has a polarity that places a diode rectifier in reverse bias to block charging of an output capacitor. When the primary-side switch is opened, the primary current and magnetic flux drop, and the resulting induced current on the secondary winding changes polarity to thereby forward bias the diode rectifier and allow charging of the output capacitor to generate a DC output voltage.

Many flyback converters employ diode rectifiers to generate the DC output voltage. The conduction loss of a diode rectifier contributes significantly to overall power loss, especially in low-voltage, high-current converter applications. The conduction loss of a diode rectifier is given by the product of its forward voltage drop and forward conduction current. By replacing the diode rectifier with a metal-oxide semiconductor field effect transistor (MOSFET) operated as a synchronous rectifier, the equivalent forward voltage drop can be lowered and, consequently, the conduction loss can be reduced. Unlike a diode rectifier, however, the conduction of the synchronous rectifier has to be actively controlled by another circuit, such as a synchronous rectifier driver.

SUMMARY

In one embodiment, a flyback converter includes a primary-side switch that controls conduction of current on a primary side of a transformer and a synchronous rectifier on a secondary side of the transformer. A synchronous rectifier driver controls the conduction of the synchronous rectifier by adaptively adjusting a turn-off threshold of the synchronous rectifier.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
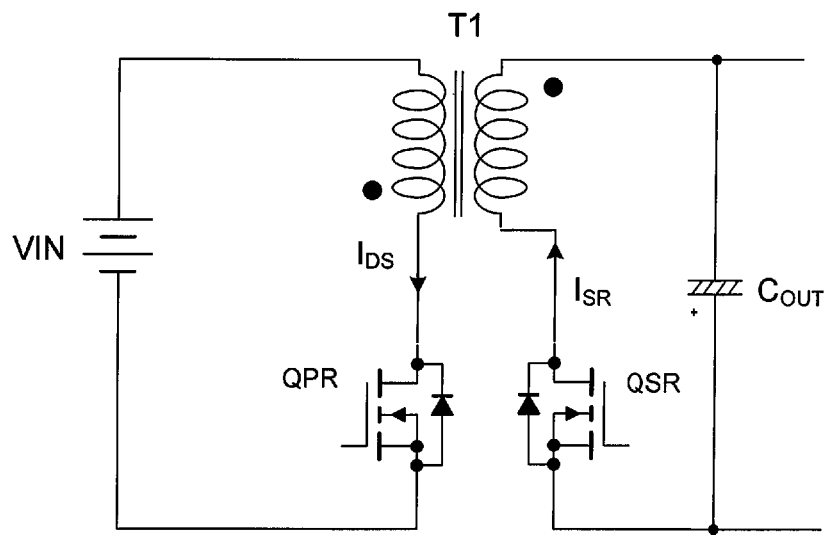
FIG. 1 shows a schematic diagram of a flyback converter that may take advantage of embodiments of the present invention.

FIG. 1 shows a schematic diagram of a flyback converter that may take advantage of embodiments of the present invention. In the example of FIG. 1, the flyback converter includes a primary-side switch QPR, a synchronous rectifier QSR, a transformer T1, and an output capacitor COUT. In one embodiment, the primary-side switch QPR and the synchronous rectifier QSR comprise MOSFETs.

When the primary-side switch QPR is turned ON, the primary winding of the transformer T1 is connected to the input voltage source VIN, resulting in a drain-to-source current IDS flowing through the primary-side switch QPR and the primary winding. When the primary side switch QPR is turned OFF, the energy stored in the primary winding is released to the secondary winding of the transformer T1. This turns ON the body diode of the synchronous rectifier QSR, resulting in a synchronous rectifier current ISR flowing through the secondary winding of the transformer T1 to charge an output capacitor COUT. At onset of body diode conduction, the synchronous rectifier QSR turns ON, thereby minimizing the forward voltage drop across the synchronous rectifier QSR by providing a low impedance current path in parallel with its body diode.

The efficiency improvement brought about by using the synchronous rectifier QSR can be maximized by minimizing body diode conduction and fully utilizing the low impedance of the channel of the synchronous rectifier QSR. However, late turn-off of the synchronous rectifier QSR may result in synchronous rectifier current inversion, which causes severe switching noise and possibly cross-conduction between the primary side switch QPR and the synchronous rectifier QSR. Accordingly, the conduction time of the body diode of the synchronous rectifier QSR should be minimized.

Figure 2:
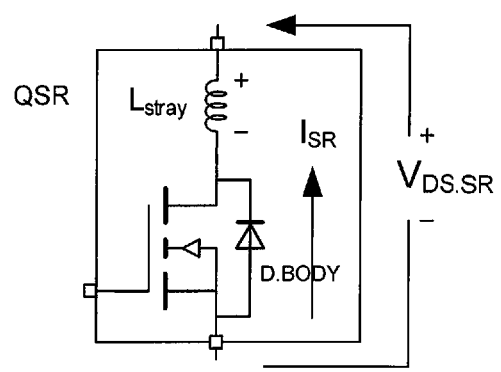
FIG. 2 shows a schematic diagram of a synchronous rectifier that may take advantage of embodiments of the present invention.

FIG. 2 shows a schematic diagram of a synchronous rectifier QSR. While the synchronous rectifier QSR is turned ON, its drain-to-source voltage VDS.SR is proportional to the synchronous rectifier current ISR because a MOSFET has constant impedance characteristics (RDSON). Thus, very short conduction of its body diode D.BODY can be achieved by turning OFF the synchronous rectifier QSR when its drain-to-source voltage VDS.SR exceeds a turn-off threshold (VTH.OFF). However, determining the proper turn-off instant of the synchronous rectifier QSR based on its instantaneous drain-to-source voltage VDS.SR is challenging because of stray inductance. More particularly, the synchronous rectifier QSR can have a stray inductance LSTRAY on its drain, which results in offset voltage (VOFFSET) being added to its drain-to-source voltage VDS.SR. Worse, the stray inductance LSTRAY varies depending on the package type of the synchronous rectifier QSR. For example, the stray inductance LSTRAY may be 9000 pH for a T0-220 package type, 5000 pH for a D2PAK package type, 4000 pH for an IPAK package type, 3000 pH for a DPAK package type, and 1000 pH for an S08 package type.

Figure 3:
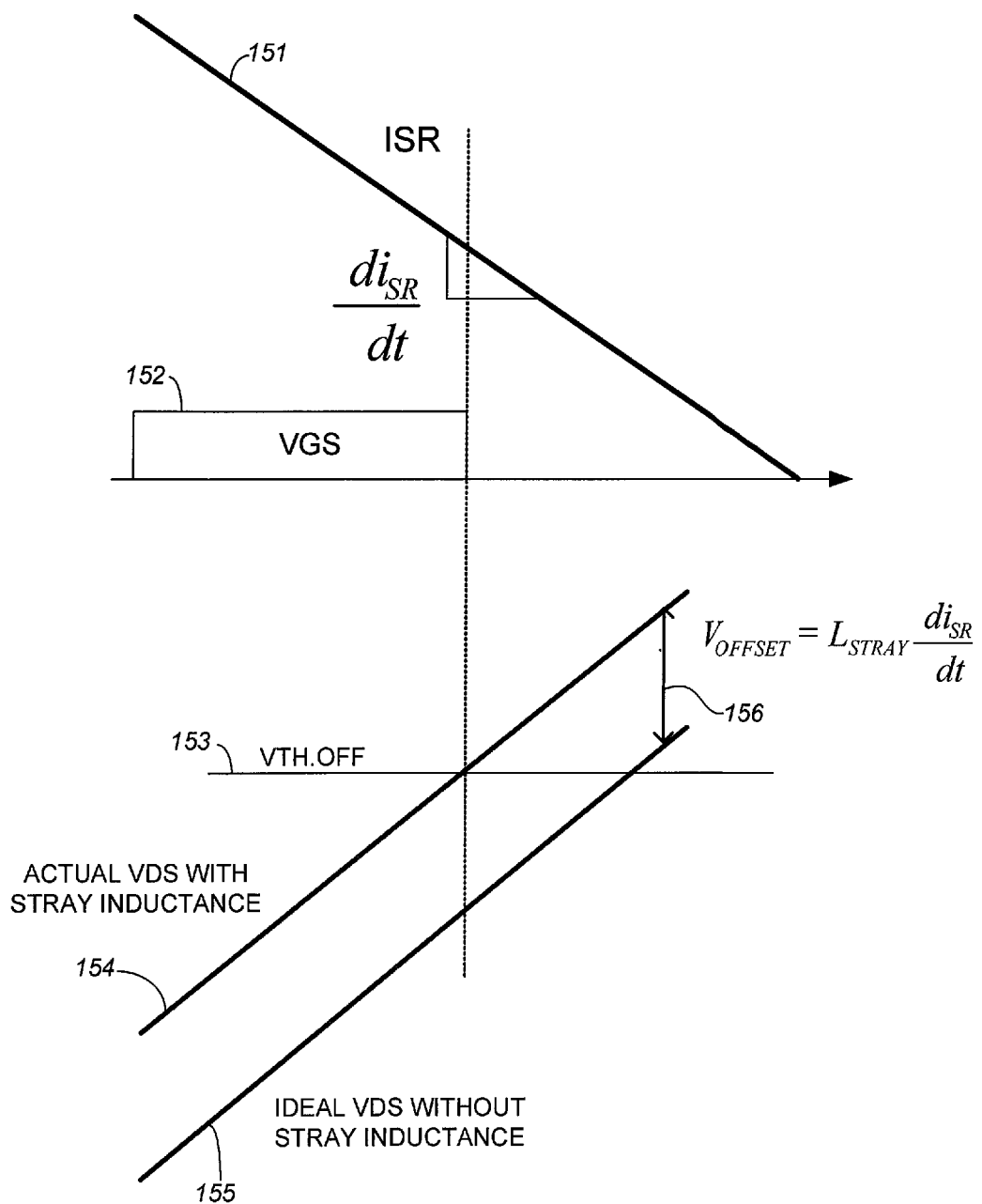
FIG. 3 illustrates how stray inductance affects the instantaneous drain-to-source voltage of a synchronous rectifier.

FIG. 3 illustrates how stray inductance affects the instantaneous drain-to-source voltage of a synchronous rectifier. FIG. 3 shows waveforms of the synchronous rectifier current ISR (see 151), the gate-to-source voltage VGS of the synchronous rectifier (see 152), the turn-off threshold of the synchronous rectifier (see 153), the actual drain-to-source voltage of the synchronous rectifier with stray capacitance (see 154), and the ideal drain-to-source voltage of the synchronous rectifier without the stray capacitance (see 155). As illustrated in FIG. 3, the actual drain-to-source voltage of the synchronous rectifier varies from the ideal drain-to-source voltage of the synchronous rectifier because of the offset voltage (see 156) introduced by the stray inductance. With a fixed turn-off threshold, this may result in the synchronous rectifier being turned OFF earlier than expected.

Figure 4:
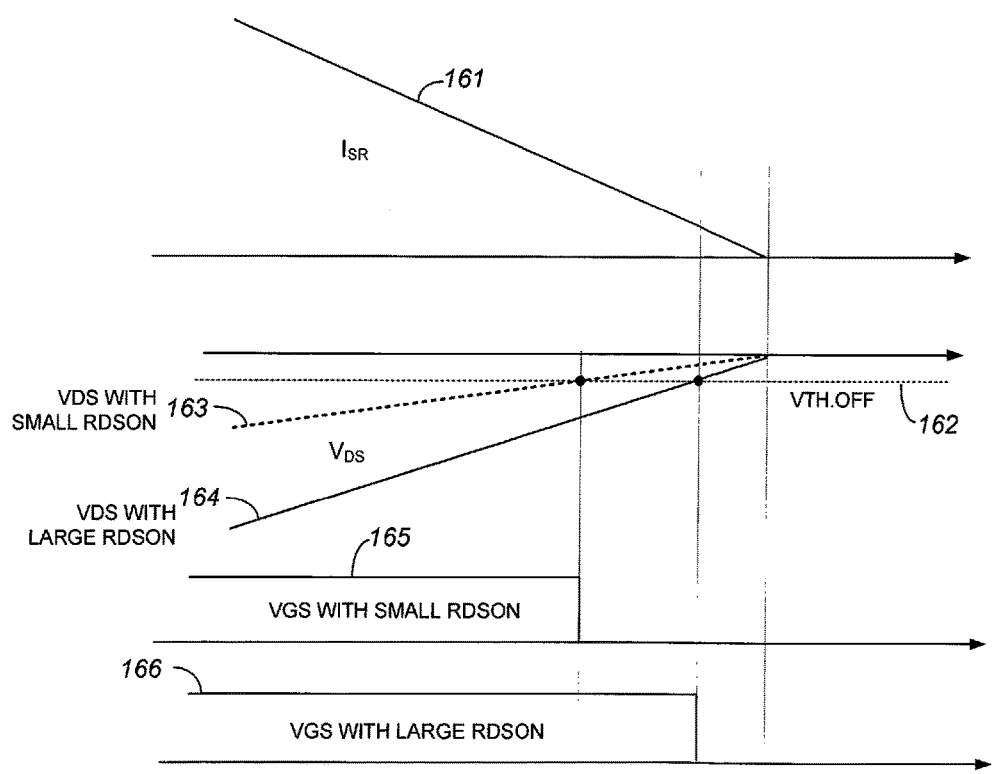
FIG. 4 illustrates how a drain-to-source ON resistance (RDSON) of a synchronous rectifier affects the conduction of the body diode of the synchronous rectifier.

FIG. 4 illustrates how the drain-to-source ON resistance (RDSON) of a synchronous rectifier affects the conduction of the body diode of the synchronous rectifier. FIG. 4 shows the synchronous rectifier current ISR (see 161), the turn-off threshold VTH.OFF of the synchronous rectifier (see 162), the drain-to-source voltage VDS of the synchronous rectifier with a small RDSON (see 163), the drain-to-source voltage VDS of the synchronous rectifier with a large RDSON (see 164), the gate-to-source voltage VGS of the synchronous rectifier with small RDSON (see 165), and the gate-to-source voltage VGS of the synchronous rectifier with large RDSON (see 166). Generally speaking, determining the turn-off instant of the synchronous rectifier with a fixed turn-off threshold based on the drain-to-source voltage cannot guarantee proper synchronous rectifier operation with minimum body diode conduction. As illustrated in FIG. 4, with a fixed turn-off threshold, body diode conduction changes with the drain-to-source ON resistance of the synchronous rectifier.

Figure 5:
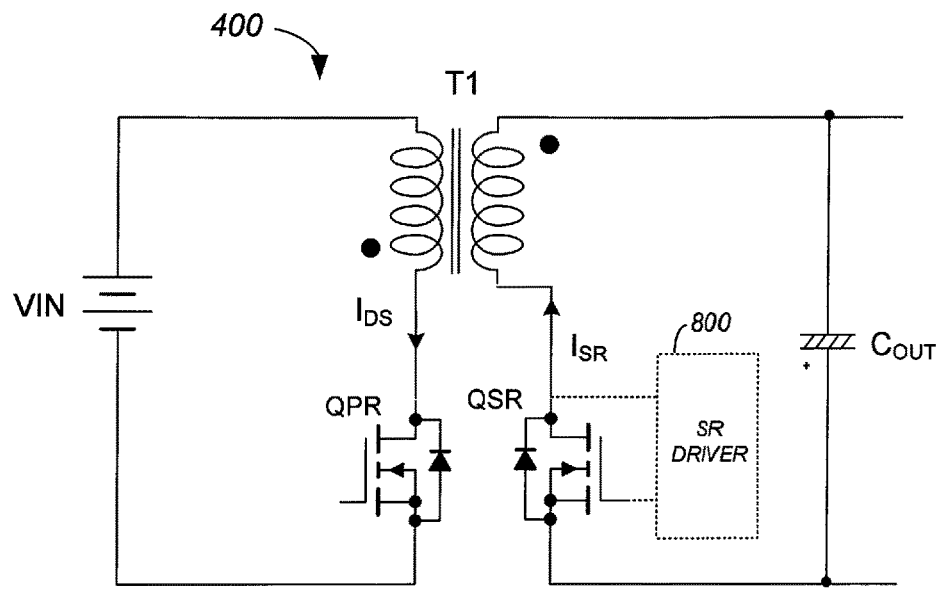
FIG. 5 shows a schematic diagram of a flyback converter in accordance with an embodiment of the present invention.

FIG. 5 shows a schematic diagram of a flyback converter 400 in accordance with an embodiment of the present invention. The flyback converter 400 of FIG. 5 is the same as that of FIG. 1 with the addition of a synchronous rectifier (SR) driver 800. The other components of the flyback converter 400 are as described with reference to FIG. 1.

Figure 6:
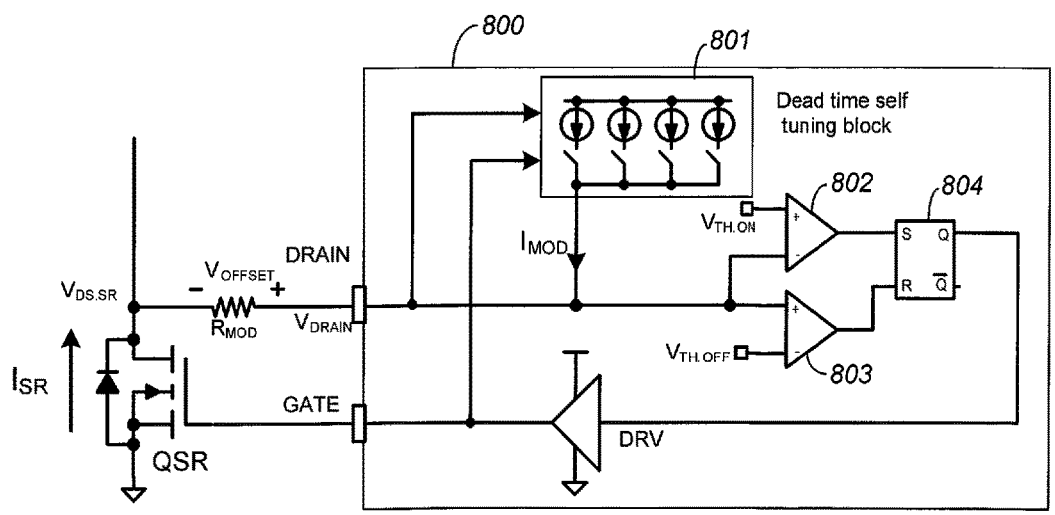
FIG. 6 shows a schematic diagram of a synchronous rectifier (SR) driver in accordance with an embodiment of the present invention.

FIG. 6 shows a schematic diagram of an SR driver 800 in accordance with an embodiment of the present invention. The SR driver 800 may be implemented as an integrated circuit (IC) that includes a DRAIN pin and a GATE pin. The DRAIN pin is connected to the drain of the synchronous rectifier QSR and the GATE pin is connected to the gate of the synchronous rectifier QSR. It is to be noted that the voltage VDRAIN on the DRAIN pin is not necessarily the same as the drain-to-source voltage VDS.SR on the drain of the synchronous rectifier QSR, because the DRAIN pin is connected to the drain of the synchronous rectifier QSR by way of a modulation resistor RMOD.

In the example of FIG. 6, the SR driver 800 includes a dead time self-tuning block 801, comparators 802 and 803, and a flip-flop 804. The comparator 802 compares the voltage VDRAIN on the DRAIN pin to an onset threshold VTH.ON (e.g., −200 mV) to detect the start of body diode conduction. When the body diode of the synchronous rectifier QSR starts to conduct, the voltage on the DRAIN pin becomes less than the onset threshold VTH.ON, thereby setting the flip-flop 804 and asserting the gate drive signal on the GATE pin to turn ON the synchronous rectifier QSR. This advantageously minimizes power loss by conducting through the channel, instead of the body diode, of the synchronous rectifier QSR.

In the example of FIG. 6, the comparator 803 compares the voltage VDRAIN on the DRAIN pin to the turn-off threshold VTH.OFF (e.g., 0V) to detect zero-crossing of the synchronous rectifier current ISR. When the synchronous rectifier current ISR zero-crosses, the voltage VDRAIN on the DRAIN pin becomes greater than the turn-off threshold VTH.OFF, thereby resetting the flip-flop 804 and de-asserting the gate drive signal on the GATE pin to turn OFF the synchronous rectifier QSR.

Figure 7:
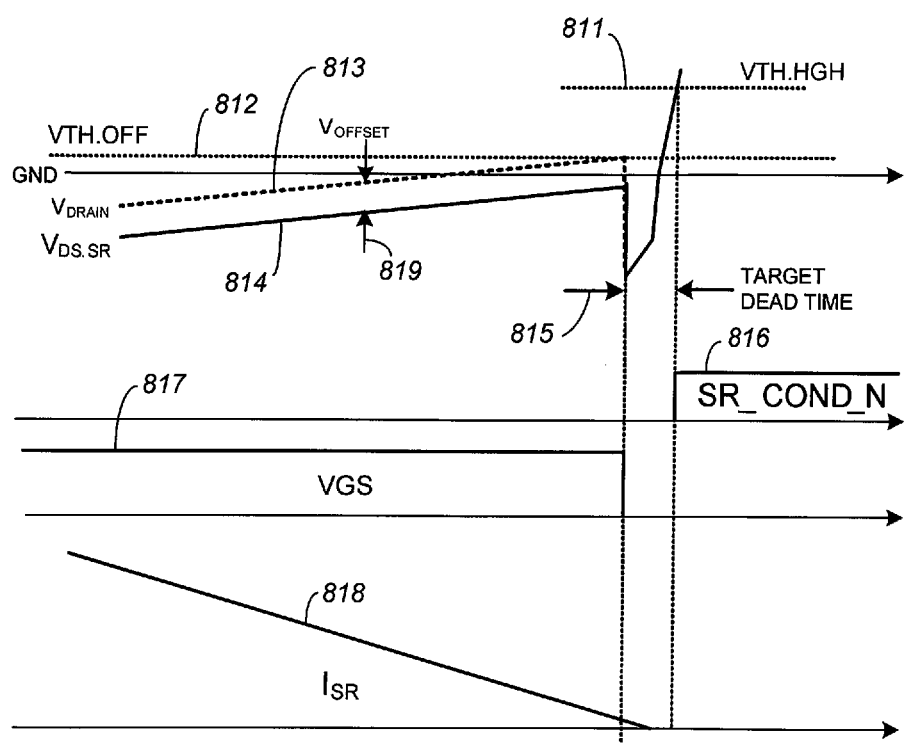
FIG. 7 shows waveforms of signals of an SR driver in accordance with an embodiment of the present invention.

FIG. 7 shows waveforms of signals of the SR driver 800 of FIG. 6 in accordance with an embodiment of the present invention. FIG. 7 shows the offset voltage VOFFSET (see 819) brought about by the difference between the voltage VDRAIN on the DRAIN pin (see 813) and the drain-to-source voltage VDS.SR (see 814) on the drain of the synchronous rectifier QSR. When the gate-to-source voltage VGS (see 817) of the synchronous rectifier QSR is asserted, the synchronous rectifier QSR turns ON and the synchronous rectifier current ISR decreases (see 818). When the voltage VDRAIN on the DRAIN pin rises above the turn-off threshold VTH.OFF (see 812), the gate-to-source voltage VGS is de-asserted to turn OFF the synchronous rectifier QSR.

Figure 10:
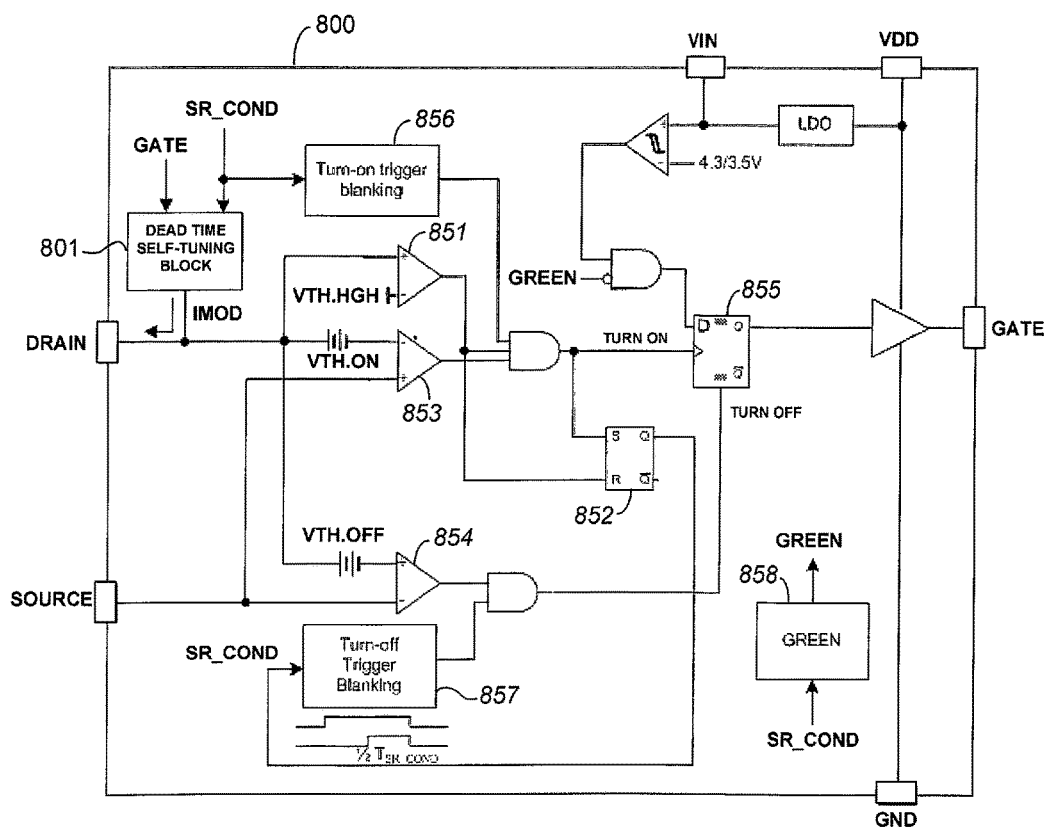
FIG. 10 shows a schematic diagram of an SR driver in accordance with an embodiment of the present invention.

In the example of FIG. 7, an SR_COND_N signal (see 816) is obtained when the drain voltage VDRAIN on the DRAIN pin rises above a high threshold VTH.HGH (see 811; e.g., 0.5V), which is used to detect end of body diode conduction and that the body diode is reverse biased. The SR_COND_N signal, which is indicative of body diode reverse bias, may be generated by the SR driver 800 using a comparator (e.g., see FIG. 10, comparator 851) to compare the voltage VDRAIN on the DRAIN pin to the high threshold VTH.HGH. The dead time (see 815) may be defined as a time duration from the falling edge of the gate drive signal on the GATE pin to the rising edge of the SR_COND_N signal. In general, the dead time is the period between turning OFF of the synchronous rectifier QSR and the end of body diode conduction.

Continuing with FIG. 6, the dead time self-tuning block 801 may comprise an adaptive current source. In one embodiment, the adaptive current source maintains the dead time to be around a target dead time (e.g., 200 ns) by modulating a modulation current IMOD. The current source may be implemented using, for example, a 4-bit digital-to-analog converter (DAC) that varies the modulation current between 0 µA to 120 µA with 8 µA step size. This results in a modulated offset voltage VOFFSET range that can be programmed using the external resistor RMOD connected between the drain of the synchronous rectifier QSR and the DRAIN pin of the SR driver 800.

In an example operation, if the measured dead time is shorter than the target dead time in a previous switching cycle, the modulation current IMOD increases by one step in the next switching cycle. If the measured dead time is longer than the target dead time in the previous switching cycle, the modulation current IMOD decreases by one step in the next switching cycle. If the measured dead time is much shorter than the target dead time in the previous switching cycle, the modulation current IMOD increases by three steps in the next switching cycle. In effect, by adjusting the modulation current IMOD based on the measured dead time, the turn-off threshold is adapted to compensate for any offset voltage, advantageously allowing the measured dead time to be maintained around the target dead time.

Figure 8:
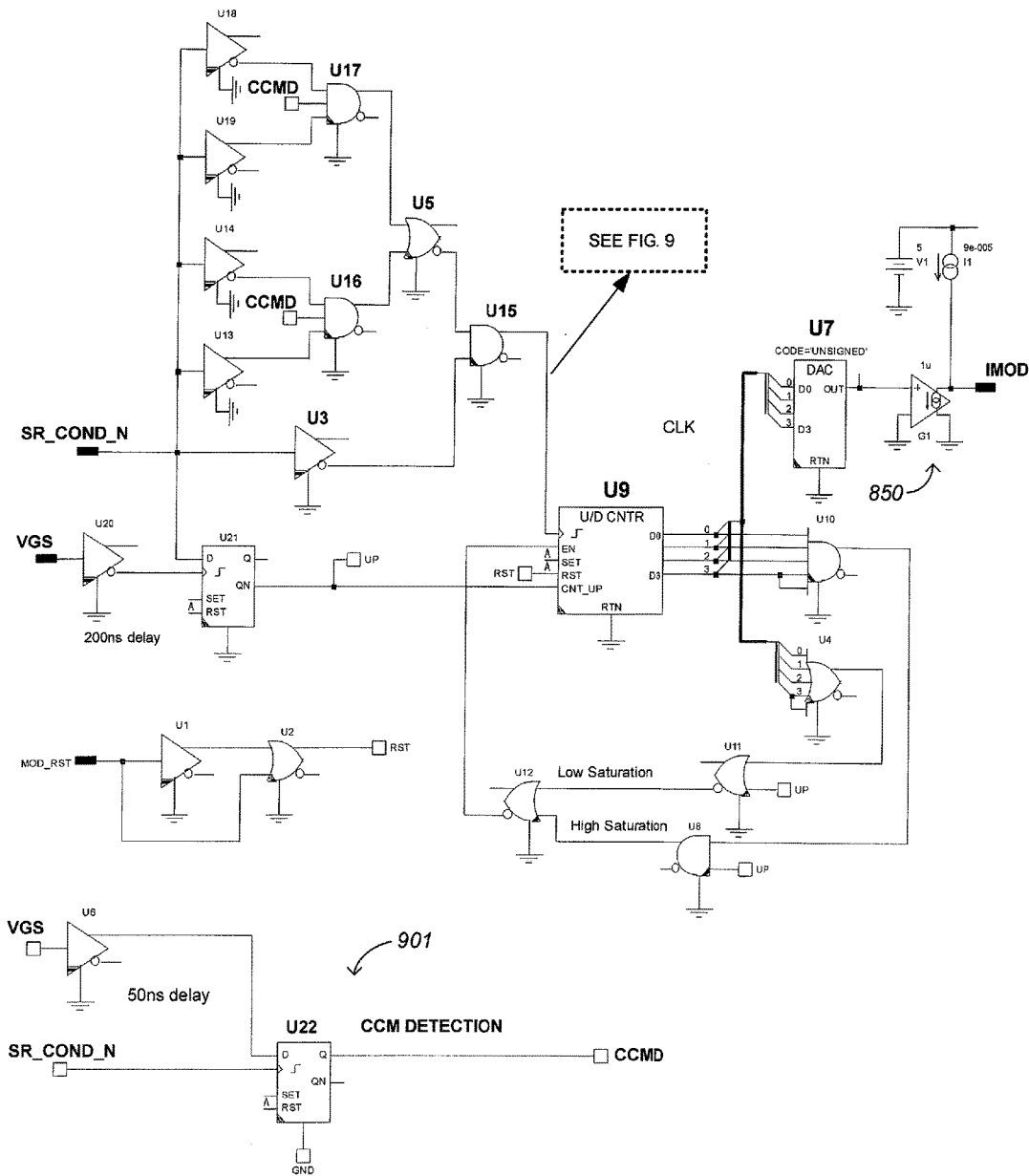
FIG. 8 shows a schematic diagram of a dead time self-tuning block in accordance with an embodiment of the present invention.

FIG. 8 shows a schematic diagram of a dead time self-tuning block 801 in accordance with an embodiment of the present invention. In the example of FIG. 8, the SR_COND_N signal clocks an up/down counter U9. A DAC U7 converts the count of the up/down counter U9 to an analog signal that drives a variable current source circuit 850, which outputs the modulation current IMOD.

Figure 9:
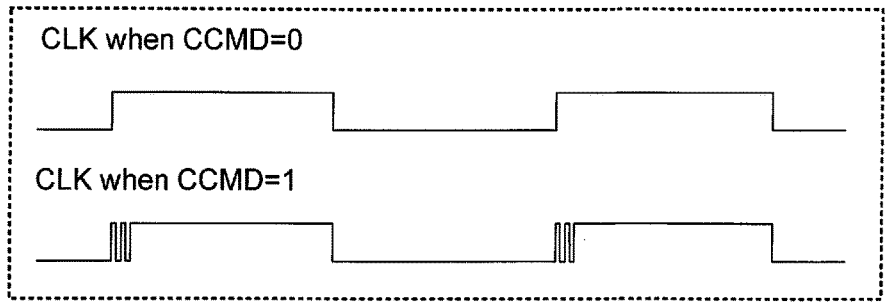
FIG. 9 shows a clock input to an up/down counter in the dead time self-tuning block of FIG. 8 in accordance with an embodiment of the present invention.

In the example of FIG. 8, the dead time self-tuning block 801 includes a continuous conduction mode (CCM) detection circuit 901 for detecting whether the flyback converter 400 is operating in continuous conduction mode or discontinuous conduction mode. The flyback converter 400 may operate in discontinuous conduction mode during light load conditions, for example. The dead time self-tuning block 801 detects the mode of operation of the flyback converter 400 by receiving the gate-to-source voltage VGS of the synchronous rectifier QSR into a flip-flop U22. The SR_COND_N signal clocks the flip-flop U22 to output a continuous conduction mode detect (CCMD) signal. In the example of FIG. 8, the CCMD signal is at a logic HIGH (CCMD=1) when continuous conduction mode is detected, and is at a logic LOW when discontinuous conduction mode is detected (CCMD=0). The CCMD signal gates the SR_COND_N signal (see inverter U3) in clocking the up/down counter U9 by way of logic gates U16, U17, U5, and U15. FIG. 9 shows the clock input to the up/down counter U9 in continuous conduction mode (CCMD=1) and in discontinuous conduction mode (CCMD=0).

FIG. 10 shows a schematic diagram of an SR driver 800 in accordance with an embodiment of the present invention. In the example of FIG. 10, the SR driver 800 includes a DRAIN pin for connecting to the drain of the synchronous rectifier QSR, a SOURCE pin for connecting to the source of the synchronous rectifier QSR, a GND pin for connecting to ground reference, a GATE pin for connecting to the gate of the synchronous rectifier QSR, a VDD pin for receiving a supply voltage, and a VIN pin for receiving an input voltage source. In the example of FIG. 10, a comparator 851 compares the voltage on the DRAIN pin to the high threshold VTH.HGH. When the voltage on the DRAIN pin rises above the high threshold VTH.HGH, indicating end of body diode conduction, a flip-flop 852 is reset to de-assert an SR_COND signal, which is the complement of the SR_COND_N signal (see FIG. 7, 816).

In the example of FIG. 10, a comparator 853 receives the drain-to-source VDS voltage of the synchronous rectifier QSR, as detected from the DRAIN and SOURCE pins, to detect onset of body diode conduction. A comparator 854 also receives the drain-to-source VDS voltage of the synchronous rectifier QSR, as detected from the DRAIN and SOURCE pins, to detect zero-crossing of the synchronous rectifier current. The level of the onset threshold VTH.ON on the negative input node of the comparator 853 and the level of the turn-off threshold VTH.OFF on the positive input node of the comparator 854 may be selected based on the particulars of the flyback converter and the synchronous rectifier QSR. When the body diode of the synchronous rectifier QSR starts to conduct, the flip-flop 855 is clocked to assert the drive signal on the GATE pin to turn ON the synchronous rectifier QSR. When the synchronous rectifier current is detected to be zero-crossing, the flip-flop 855 is reset to de-assert the drive signal on the GATE pin to turn OFF the synchronous rectifier QSR.

In the example of FIG. 10, the SR driver 800 further includes circuits for blanking turn ON of the synchronous rectifier QSR (see 856), for blanking turn OFF of the synchronous rectifier QSR (see 857), and for synchronizing the switching operation of the synchronous rectifier QSR with optional "green", i.e., energy efficiency, circuits (see 858). As before, the dead time self-tuning block 801 modulates the modulation current IMOD to adjust the offset voltage on the DRAIN pin and thereby maintain the dead time to be around the target dead time.

Figure 11:
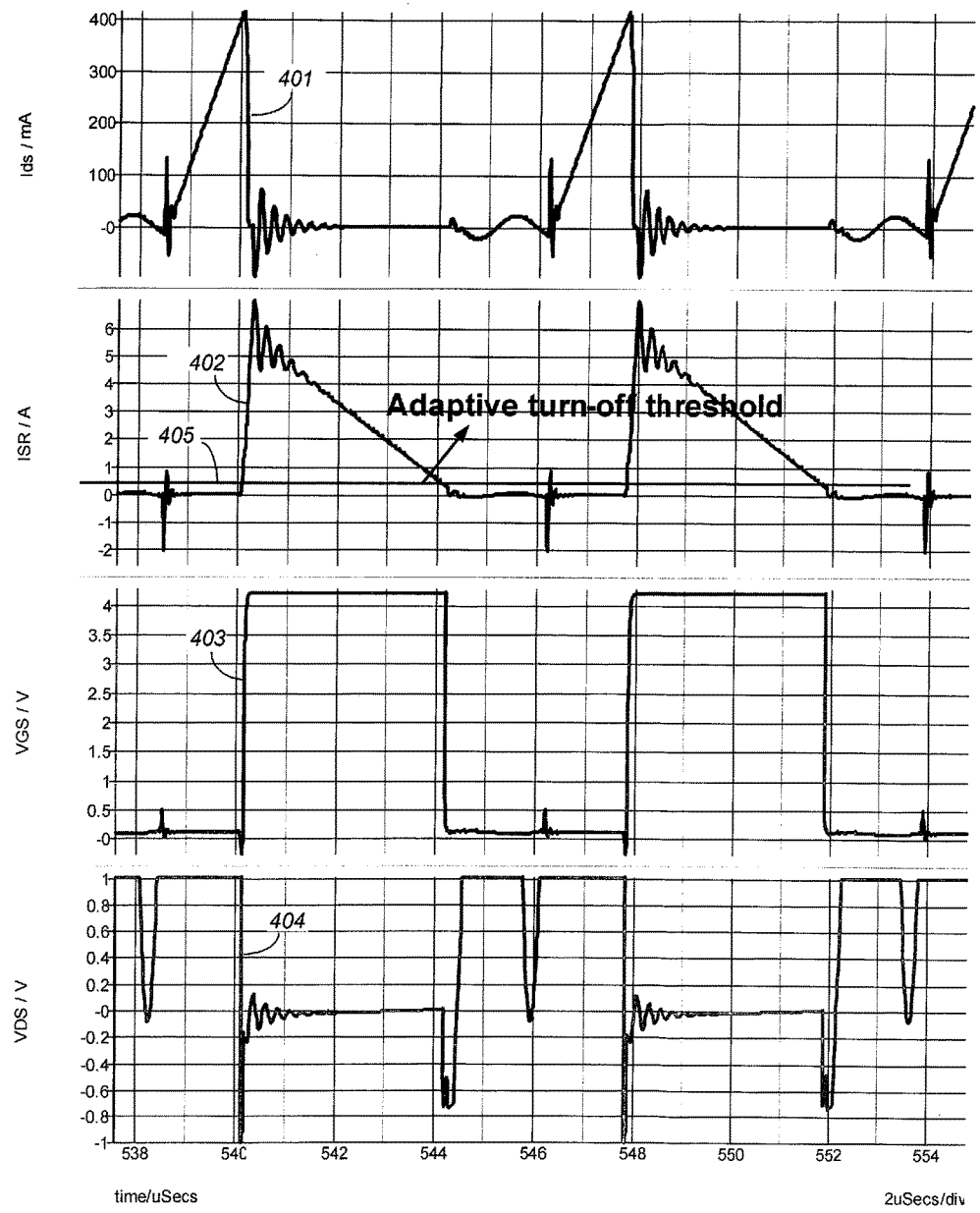
FIGS. 11 and 12 show waveforms of signals of a flyback converter in accordance with an embodiment of the present invention.
Figure 12:
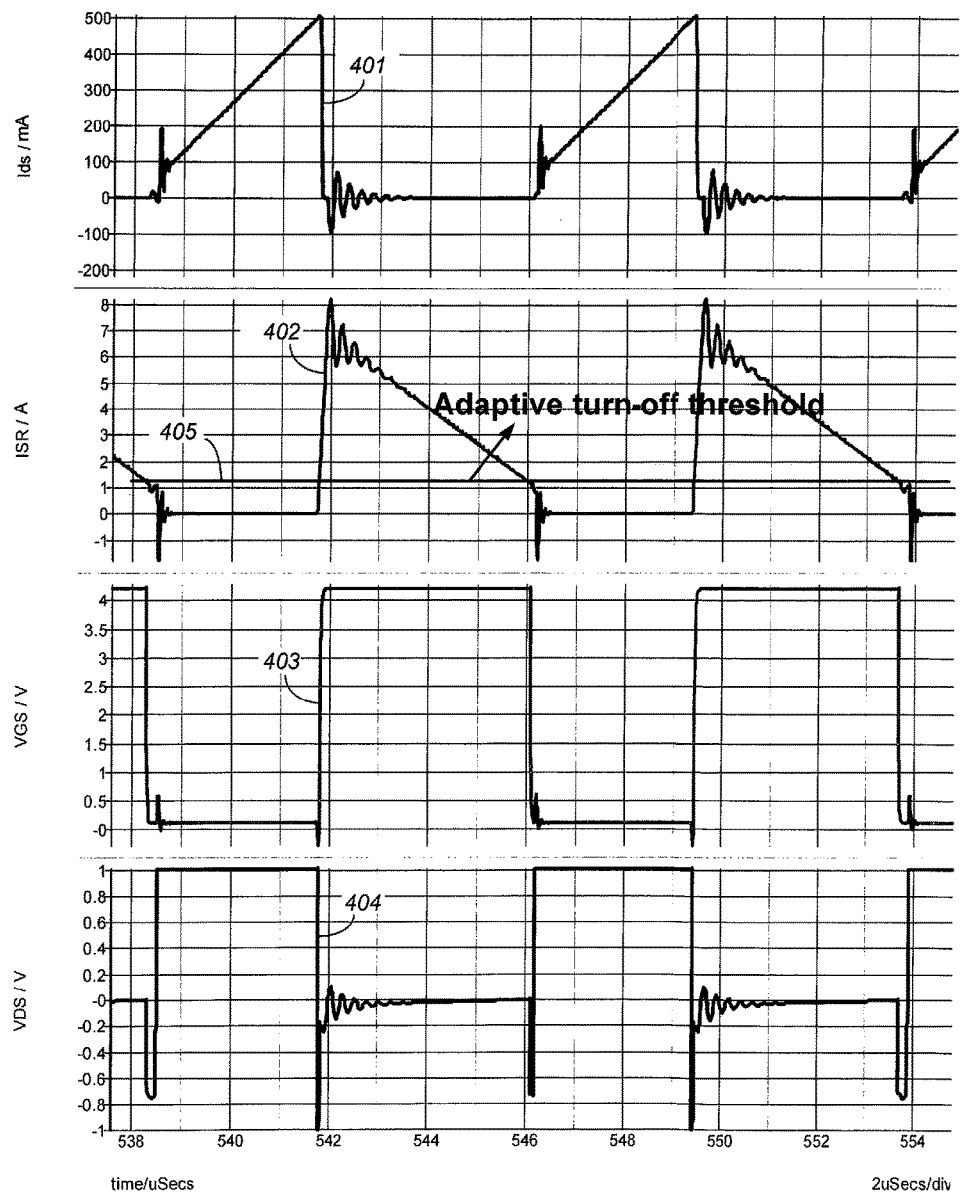

FIGS. 11 and 12 show waveforms of signals of the flyback converter 400 (see FIG. 5) in accordance with an embodiment of the present invention. FIGS. 11 and 12 show, from top to bottom, the current through the primary winding of the transformer T1 (see 401), the synchronous rectifier current ISR (see 402), the gate-to-source voltage VGS of the synchronous rectifier QSR (see 403), and the drain-to-source voltage VDS of the synchronous rectifier QSR (see 404). FIG. 11 shows waveforms of signals of the flyback converter 400 in continuous conduction mode, and FIG. 12 shows waveforms of signals of the flyback converter 400 in discontinuous conduction mode. By modulating the offset voltage, the turn-off threshold (see 405) is dynamically adjusted to adapt to different RDSON and offset voltages, allowing for more stable operation compared to flyback converters with a fixed turn-off threshold.

Figure 13:
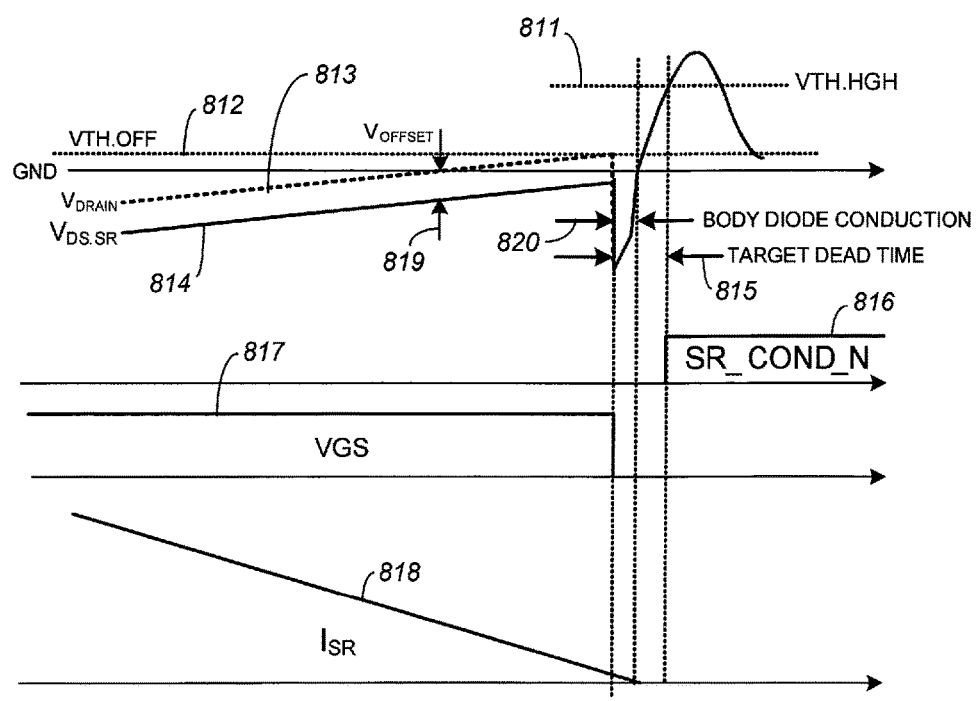
FIGS. 13 and 14 show waveforms of signals of an SR driver relative to body diode conduction in accordance with an embodiment of the present invention.
Figure 14:
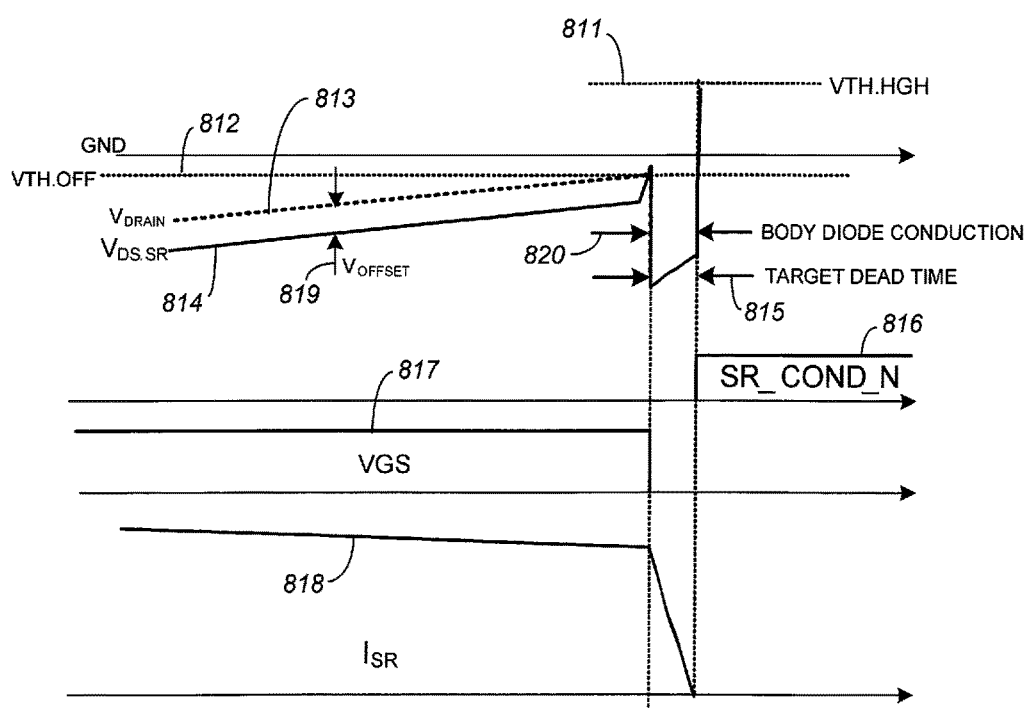

FIGS. 13 and 14 show waveforms of signals of an SR driver 800 (e.g., see FIG. 6) relative to body diode conduction in discontinuous conduction mode and continuous conduction mode, respectively, in accordance with an embodiment of the present invention. The waveforms shown in FIGS. 13 and 14 are generally the same as those shown and previously discussed in FIG. 7, except for the addition of a label 820 to indicate conduction time of the body diode of the synchronous rectifier QSR.

As shown in FIG. 13, embodiments of the present invention minimize body diode conduction time in discontinuous conduction mode when the actual body diode conduction time (see FIG. 13, 820) is shorter than the target dead time (see FIG. 13, 815). As illustrated in FIG. 14, embodiments of the present invention provide more margin against cross-conduction in continuous conduction mode when the actual body diode conduction time (see FIG. 14, 820) is the same as the target dead time (see FIG. 14, 815). Advantageously, embodiments of the present invention thus allow for a target dead time that is much shorter than that of conventional flyback converters.

Figure 15:
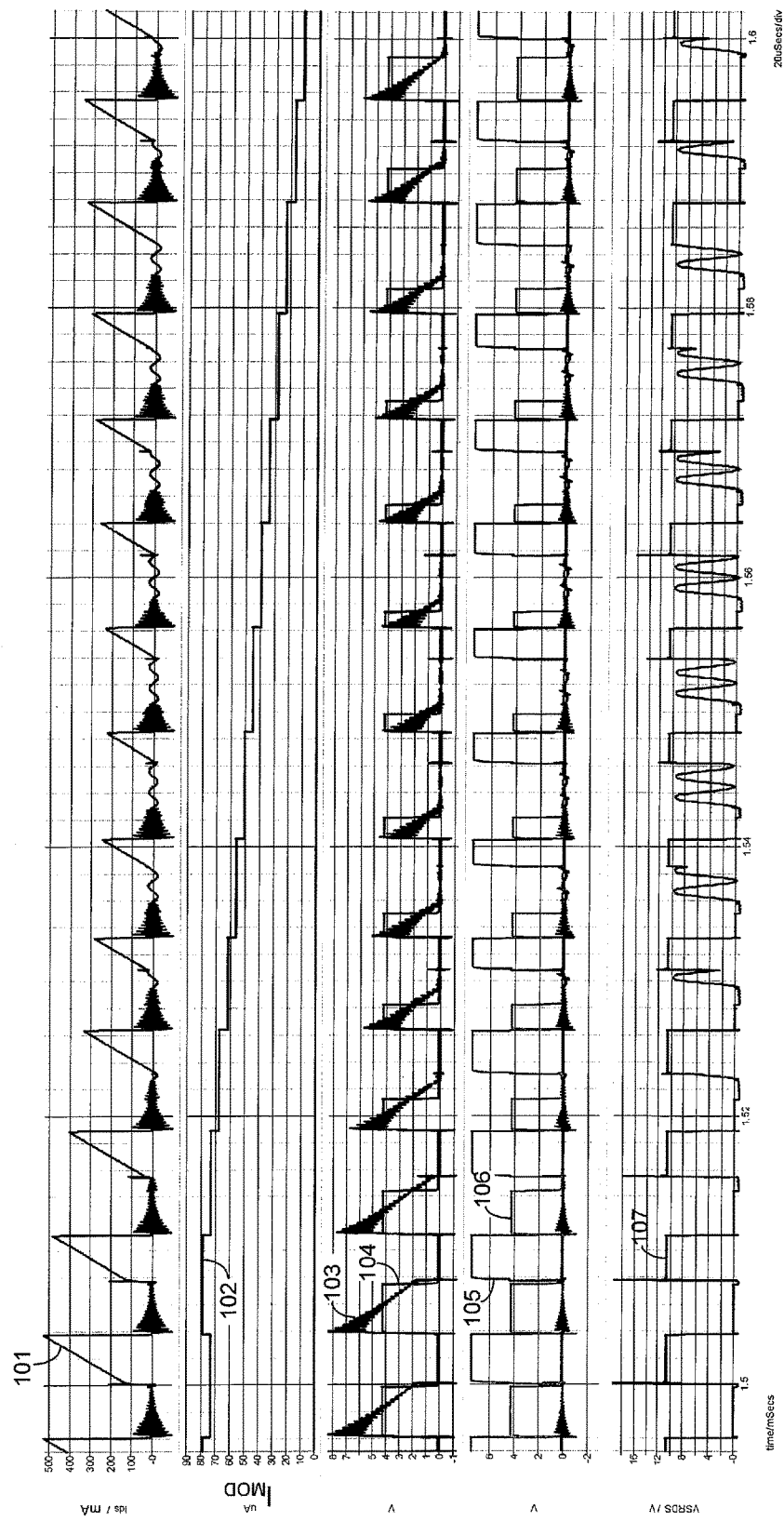
FIGS. 15 and 16 show waveforms of signals of a flyback converter in accordance with an embodiment of the present invention.
Figure 16:
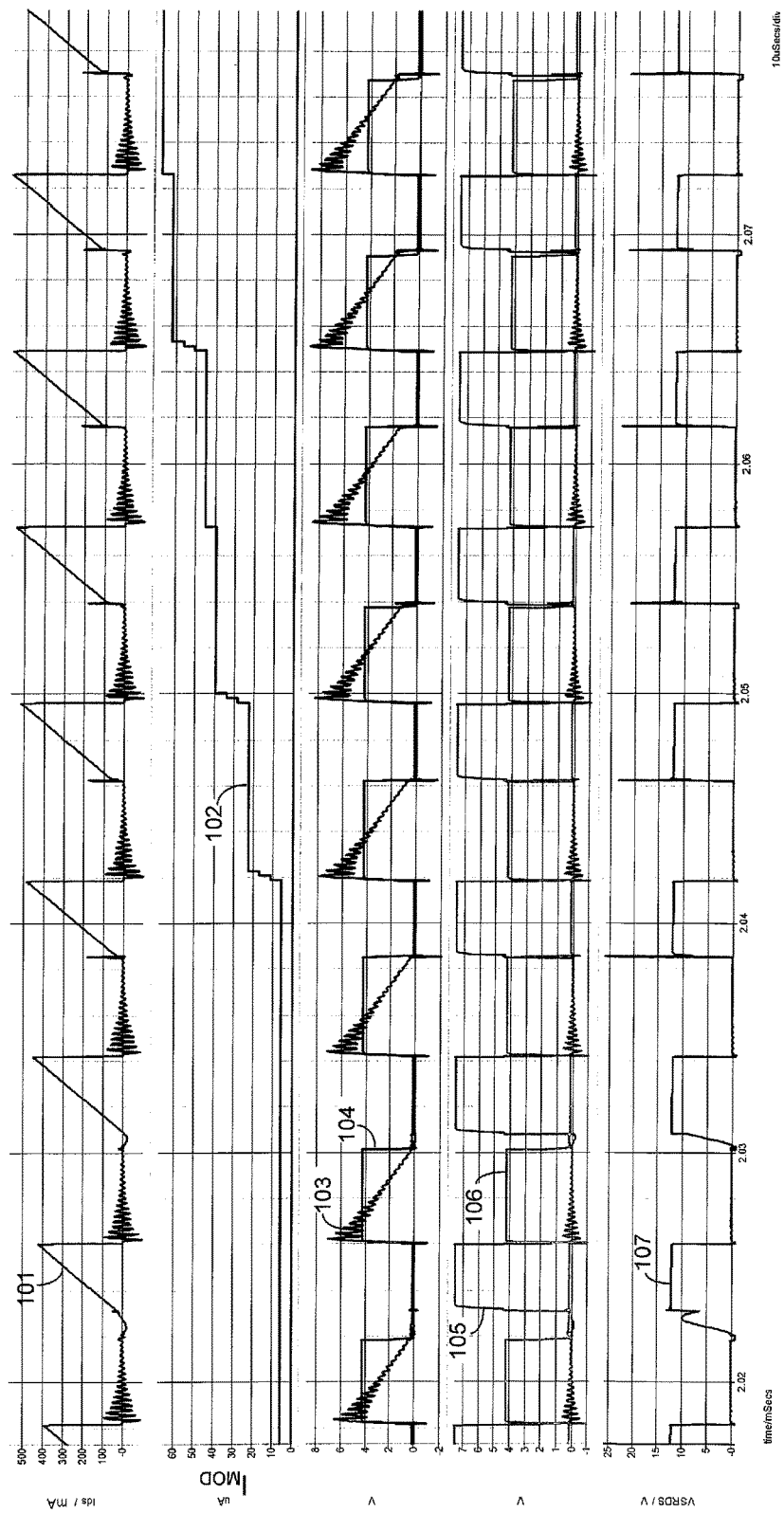

FIGS. 15 and 16 show waveforms of signals of a flyback converter 400 (e.g., see FIG. 5) in accordance with an embodiment of the present invention. FIGS. 15 and 16 show the current through the primary winding of the transformer T1 (see 101), the modulation current IMOD (see 102) generated by the dead time self-tuning block 801, the synchronous rectifier current ISR (see 103) relative to the gate drive signal to the synchronous rectifier QSR (see 104), the gate drive signal to the primary-side switch QPR (see 105) relative to gate drive signal to the synchronous rectifier QSR (see 106), and the drain-to-source voltage of the synchronous rectifier QSR (107).

FIG. 15 shows waveforms of signals of the flyback converter 400 during transition from continuous conduction mode to discontinuous conduction mode. Note that the modulation current IMOD gradually decreases (one step for each switching cycle; see FIG. 15, 102) to find a proper modulation current in the transition from continuous conduction mode to discontinuous conduction mode. FIG. 16 shows waveforms of signals of the flyback converter 400 during transition from discontinuous conduction mode to continuous conduction mode. Note that in transitioning from discontinuous conduction mode to continuous conduction mode, the modulation current IMOD quickly increases (three steps for each switching cycle; see FIG. 16, 102) to prevent cross-conduction between the primary-side switch QPR and the synchronous rectifier QSR.

Circuits and methods of flyback converters with self-tuning dead time control have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A flyback converter comprising:
   a transformer;
   a synchronous rectifier on a secondary side of the transformer; and
   a synchronous rectifier driver that controls switching of the synchronous rectifier, the synchronous rectifier driver being configured to turn OFF the synchronous rectifier in response to detecting a drain-to-source voltage VD S of the synchronous rectifier rising above a turn-off threshold and to adjust the turn-off threshold based on a detected dead time between turning off of the synchronous rectifier and an end of conduction of a body diode of the synchronous rectifier,
   wherein the synchronous rectifier driver comprises a dead time self-tuning block that is configured to generate a modulation current and to adjust the modulation current based on the detected dead time.

2. The flyback converter of claim 1, wherein the dead time self-tuning block adjusts the modulation current at a first rate when the flyback converter is transitioning from a continuous conduction mode to a discontinuous conduction mode, and the dead time self-tuning block adjusts the modulation current at a second rate that is faster than the first rate when the flyback converter is transitioning from the discontinuous conduction mode to the continuous conduction mode.

3. The flyback converter of claim 1, wherein the dead time self-tuning block adjusts the modulation current in step size.

4. The flyback converter of claim 3, wherein the dead time self-tuning block increases the step size depending on a difference between the detected dead time and a target dead time.

5. The flyback converter of claim 1, wherein the synchronous rectifier driver comprises:
   a counter;
   a digital to analog converter (DAC) that is configured to convert a count of the counter to an analog signal; and
   a variable current source circuit that is configured to receive the analog signal to generate the modulation current.

6. The flyback converter of claim 1, wherein the modulation current adjusts an offset voltage between a drain of the synchronous rectifier and a node of the synchronous rectifier driver.

7. The flyback converter of claim 6, wherein the synchronous rectifier driver is in an integrated circuit (IC) package, the synchronous rectifier is external to the IC package, and the node of the synchronous rectifier driver that is connected to the drain of the synchronous rectifier is a pin of the IC package.

8. The flyback converter of claim 7, further comprising a modulation resistor for programming a range of the turn-off threshold, wherein a first end of the modulation resistor is connected to the drain of the synchronous rectifier and a second end of the modulation resistor is connected to the pin of the IC package.

9. A synchronous rectifier driver comprising:
   a comparator circuit that compares a turn-off threshold to a drain-to-source voltage of a synchronous rectifier, and turns off the synchronous rectifier when a result of the comparison indicates that a synchronous rectifier current that flows through the synchronous rectifier and a secondary winding of a transformer is zero-crossing; and
   a dead time self-tuning block that adjusts the turn-off threshold by generating and modulating a modulation current that changes an offset voltage on a node of the synchronous rectifier.

10. The synchronous rectifier driver of claim 9, wherein the dead time self-tuning block comprises:
    a counter;
    a digital to analog converter (DAC) that converts a count of the counter to an analog signal; and
    a variable current source circuit that transforms the analog signal to the modulation current.

11. The synchronous rectifier driver of claim 9, wherein the offset voltage is between a drain of the synchronous rectifier and a pin of an integrated circuit (IC) package of the synchronous rectifier driver.

12. The synchronous rectifier driver of claim 11, further comprising a modulation resistor that is connected between the drain of the synchronous rectifier and the pin of the IC package of the synchronous rectifier driver.

13. The synchronous rectifier driver of claim 9, wherein the dead time self-tuning block adjusts the turn-off threshold based on a detected dead time from when the synchronous rectifier was turned off to when a body diode of the synchronous rectifier stopped conducting in a previous switching cycle.

14. The synchronous rectifier driver of claim 13, wherein the dead time self-tuning block adjusts the modulation current based on a difference between the detected dead time and a target dead time.

15. A method of operating a flyback converter, the method comprising:

detecting a dead time between turning off of a synchronous rectifier and an end of conduction of a body diode of the synchronous rectifier, the synchronous rectifier being connected to a secondary winding of a transformer of the flyback converter;

adjusting a turn-off threshold based on the detected dead time by generating a modulation current and changing the modulation current based on a difference between the detected dead time and a target dead time; and turning OFF the synchronous rectifier in response to detecting a drain-to-source voltage of the synchronous rectifier increasing above the turn-off threshold.

16. The method of claim 15, wherein adjusting the turn-off threshold further comprises:

flowing the modulation current to a drain of the synchronous rectifier to adjust an offset voltage between the drain of the synchronous rectifier and a node of the synchronous rectifier driver.

17. The method of claim 16, wherein the node of the synchronous rectifier driver is a pin of an integrated circuit (IC) package of the synchronous rectifier driver, and the modulation current flows to a resistor between the drain of the synchronous rectifier and the pin of the IC package of the synchronous rectifier driver.

18. The method of claim 16, wherein the modulation current is changed in step size.

19. The method of claim 18, further comprising:

increasing the step size depending on the difference between the detected dead time and the target dead time.

* * * * *